United States Patent
Pal et al.

(10) Patent No.: US 12,556,950 B2
(45) Date of Patent: Feb. 17, 2026

(54) SELF-HEALING OF AN APPLICATION IN A DISTRIBUTED ARCHITECTURE

(71) Applicant: RAKUTEN SYMPHONY, INC., Tokyo (JP)

(72) Inventors: Pratim Pal, Bangalore (IN); Vinay Kumar Nagendra, Bangalore (IN); Rakesh Chiduva Ramakrishna, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 400 days.

(21) Appl. No.: 18/191,830

(22) Filed: Mar. 28, 2023

(65) Prior Publication Data

US 2024/0334215 A1    Oct. 3, 2024

(51) Int. Cl.
*H04W 24/08*      (2009.01)
*H04L 41/0654*    (2022.01)
*H04W 84/04*      (2009.01)

(52) U.S. Cl.
CPC ......... *H04W 24/08* (2013.01); *H04L 41/0654* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 2020/0004668 A1* | 1/2020 | Dwivedi | G06F 11/0718 |
| 2022/0014963 A1* | 1/2022 | Yeh | G06N 3/045 |
| 2022/0038902 A1* | 2/2022 | Mueck | H04L 63/1433 |
| 2022/0147409 A1* | 5/2022 | Linck | G06F 11/0787 |
| 2024/0205865 A1* | 6/2024 | Subramani Jayavelu | H04W 24/02 |
| 2024/0259879 A1* | 8/2024 | Ranganath | H04L 41/5054 |

* cited by examiner

Primary Examiner — Peter P Chau
(74) Attorney, Agent, or Firm — HAUPTMAN HAM, LLP

(57) ABSTRACT

Self-healing of an application in a distributed architecture. A system manager microservice continuously updates state information of a plurality of microservices to a database. A health check microservice determines one or more down microservices from the plurality of microservices. An orchestration layer restarts the one or more down microservices. The system manager microservice generates updated states by performing an audit of state entries retrieved from the database based on a list of states obtained from a data store microservice to generate updated states for the plurality of microservices. Based on the audit of the database entries, the system manager microservice provides the updated states for the plurality of microservices to the database. Operation of the plurality of microservices is resumed based on the updated states for the plurality of microservices.

20 Claims, 9 Drawing Sheets

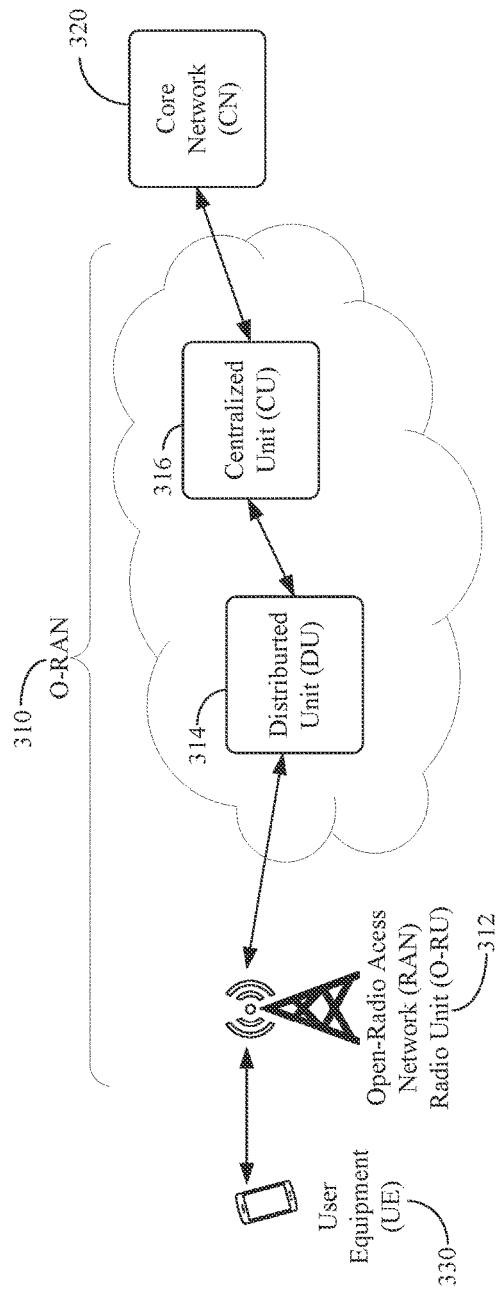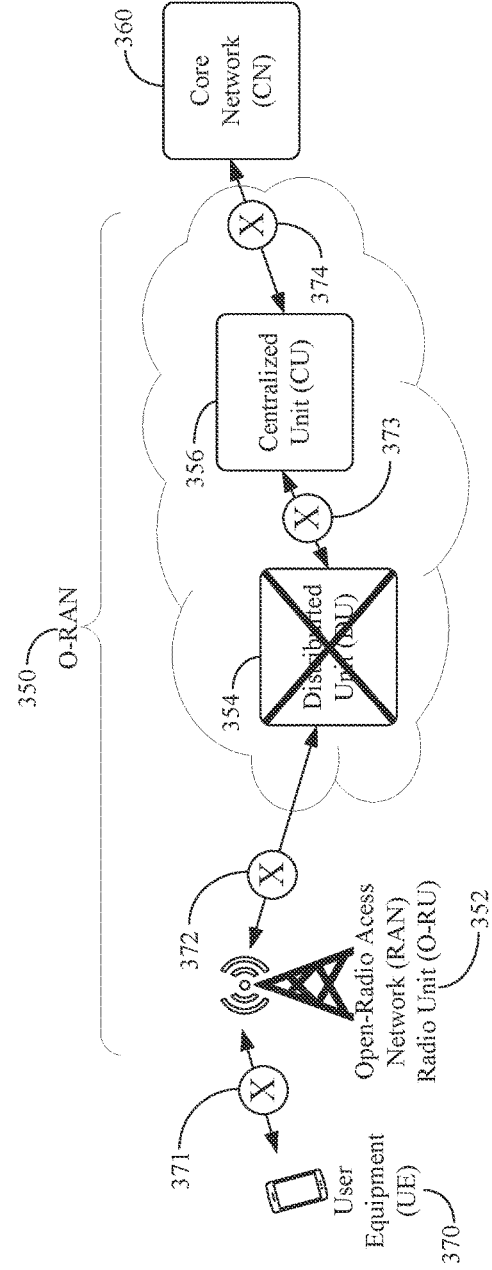
Fig. 3A
Fig. 3B

SELF-HEALING OF AN APPLICATION IN A DISTRIBUTED ARCHITECTURE

TECHNICAL FIELD

This description relates to self-healing of an application in a distributed architecture, and method of using the same.

BACKGROUND

Open-Radio Access Network (O-RAN) is a disaggregated implementation of mobile fronthaul and midhaul networks built on cloud native principles. O-RAN is an evolution of the Next Generation RAN (NG-RAN) architecture, first introduced by Third Generation Partnership Project (3GPP) in their release 15 (5G version 1) Technical Specification (TS) 38.401. The O-RAN Alliance was formed to undertake the advancement of NG-RAN philosophies, expanding on the scope of what was originally outlined by the 3GPP. 3GPP and O-RAN share several common technological features, allowing for the freedom of choice for vendor-specific implementations.

In 3GPP and O-RAN architectures, a 5G gNB is split into nodes including a Centralized Unit (CU), a Distributed Unit (DU), and a Radio Unit (RU). The CU, DU, and RU operate as a monolithic application for supporting Network Functions (NF). For example, a DU is responsible for handling layer1 (higher Physical (PHY) layer) and layer2 (Media Access Control (MAC) layer) packet processing, F1 interface management, CU plane (Control & User plane) packets, Synchronization plane management, Management plane Netconf message handling, cell state maintenance, etc. RU is the radio hardware unit that coverts radio signals sent to and from the antenna into a digital signal for transmission over packet networks. RU handles the Digital Front End (DFE) and the lower PHY layer, as well as the digital beamforming functionality. The CU runs the Radio Resource Control (RRC) and Packet Data Convergence Protocol (PDCP) layers.

A failure or an application crash at a node causes service unavailability of the sector. User Equipment (UE) connected to that network encounter service discontinuity or abrupt termination of ongoing calls. To recover, the NF of a node is restarted, which is a time consuming process because of the size and complexity of the monolithic Network Function application for a node.

SUMMARY

In at least embodiment, a method for providing self-healing of an application in a distributed architecture includes continuously updating, by a system manager microservice, state information of a plurality of microservices to a database, determining, by a health check microservice, one or more down microservices from the plurality of microservices, restarting, by an orchestration layer, the one or more down microservices, generating, by the system manager microservice, updated states by performing an audit of state entries retrieved from the database based on a list of states obtained from a data store microservice to generate updated states for the plurality of microservices, based on the audit of the database entries, providing, by system manager microservice, the updated states for the plurality of microservices to the database, and resuming operation of the plurality of microservices based on the updated states for the plurality of microservices.

In at least one embodiment, an Open-Radio Access Network (O-RAN) Node includes a memory storing computer-readable instructions, and a processor connected to the memory, wherein the processor is configured to execute the computer-readable instructions to continuously update state information of a plurality of microservices to a database, determine one or more down microservices from the plurality of microservices, restart the one or more down microservices, generate updated states by performing an audit of state entries retrieved from the database based on a list of states obtained from a data store microservice to generate updated states for the plurality of microservices, based on the audit of the database entries, provide the updated states for the plurality of microservices to the database, and resume operation of the plurality of microservices based on the updated states for the plurality of microservices.

In at least one embodiment, non-transitory computer-readable media having computer-readable instructions stored thereon, which when executed by a processor causes the processor to perform operations including continuously updating, by a system manager microservice, state information of a plurality of microservices to a database, determining, by a health check microservice, one or more down microservices from the plurality of microservices, restarting, by an orchestration layer, the one or more down microservices, generating, by the system manager microservice, updated states by performing an audit of state entries retrieved from the database based on a list of states obtained from a data store microservice to generate updated states for the plurality of microservices, based on the audit of the database entries, providing, by system manager microservice, the updated states for the plurality of microservices to the database, and resuming operation of the plurality of microservices based on the updated states for the plurality of microservices.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

FIGS. 3A-B illustrate the effect of a failure of a functional unit in an Open-Radio Access Network (O-RAN) according to at least one embodiment.

DETAILED DESCRIPTION

Figure 1:
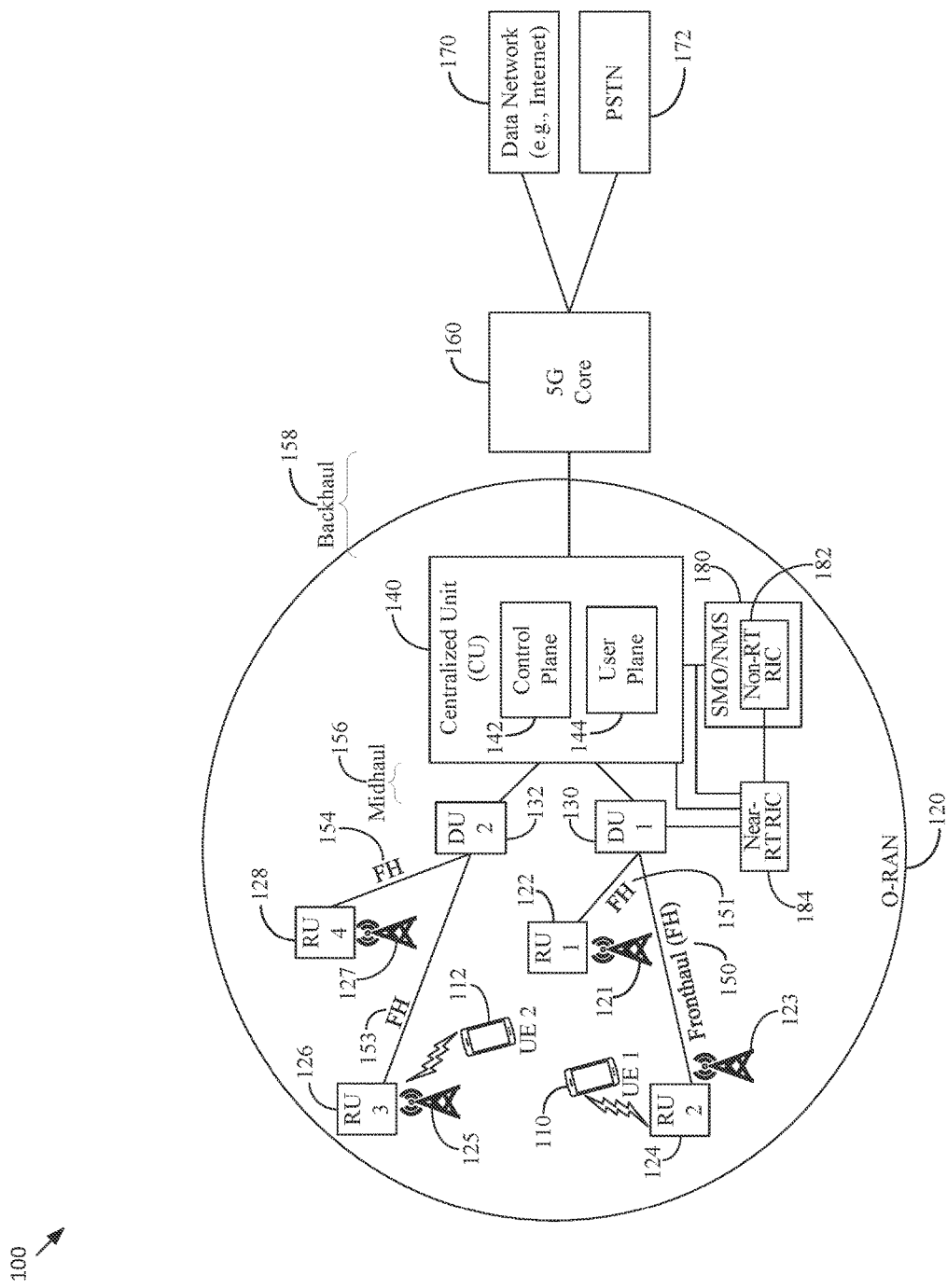
FIG. 1 illustrates a mobile network according to at least one embodiment.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, data-streams, or signaling-streams. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB)," "home access point (HAP)," or the like refer to a wireless network component or apparatus that serves and receives data, control, voice, video, sound, gaming, data-streams, or signaling-streams from UE.

As per 3GPP and O-RAN architecture, an O-RAN is split into nodes including Centralized Unit (CU), Distributed Unit (DU), and Radio Unit (RU). The individual nodes of an O-RAN operate as a monolithic application for supporting Network Functions. For example, DU is responsible for handling layer1 (higher PHY) and layer2 (MAC) packet processing, F1 interface management, CU plane (Control & User plane) packets, Synchronization plane management, Management plane Netconf message handling, cell state maintenance etc. Failure or an application crash causes service unavailability of the sector. UEs connected to that network encounter service discontinuity or abrupt termination of ongoing call. To recover, that application is restarted, which is time consuming process because of its size and complexity. Herein, application and microservice are used interchangeably.

To address this problem, one or more independent microservices are implemented to provide Network Functions. In at least one embodiment, a method for providing self-healing of an application in a distributed architecture includes continuously updating, by a system manager microservice, state information of a plurality of microservices to a database, determining, by a health check microservice, one or more down microservices from the plurality of microservices, restarting, by an orchestration layer, the one or more down microservices, generating, by the system manager microservice, updated states by performing an audit of state entries retrieved from the database based on a list of states obtained from a data store microservice to generate updated states for the plurality of microservices, based on the audit of the database entries, providing, by system manager microservice, the updated states for the plurality of microservices to the database, and resuming operation of the plurality of microservices based on the updated states for the plurality of microservices.

Embodiments described herein provide one or more advantages. For example, implementation of at least one embodiment is able to avoid a single point of failure, reduce application spawn time, provide zero impact in cell availability Key Performance Indicators (KPI) due to application failure, provide uninterrupted service delivery by application, enable quick recovery of the application, enable automatic healing from software crashes, eliminates use of human intervention during self-healing (cost saving), provide high availability restarts from a last checkpoint, etc.

FIG. 1 illustrates a mobile network 100 according to at least one embodiment.

In FIG. 1, UE 1 (User Equipment 1) 110 and UE 2 112 access Mobile Network 100 via an Open-Radio Access Network (O-RAN) 120. O-RAN 120 is split into nodes including Centralized Unit (CU), Distributed Unit (DU), and Radio Unit (RU). Radio Access Network 120 includes Radio Towers 121, 123, 125, and 127. Radio Towers 121, 123, 125, 127 are associated with RU (Radio Unit) 1 122, RU 2 124, RU 3 126, and RU 4 128, respectively.

RU 1 122, RU 2 124, RU 3 126, RU 4 128 handle the Digital Front End (DFE) and the parts of the PHY layer, as well as the digital beamforming functionality. RU 1 122 and RU 2 124 are associated with Distributed Unit (DU) 1 130, and RU 3 126 and RU 4 128 are associated with DU 2 132. DU 1 130 and DU 2 132 are responsible for real time Layer 1 and Layer 2 scheduling functions. For example, in 5G, Layer-1 is the Physical Layer, Layer-2 includes the Media Access Control (MAC), Radio link control (RLC), and Packet Data Convergence Protocol (PDCP) layers, and Layer-3 (Network Layer) is the Radio Resource Control (RRC) layer. Layer 2 is the data link or protocol layer that defines how data packets are encoded and decoded, how data is to be transferred between adjacent network nodes. Layer 3 is the network routing layer and defines how data is moves across the physical network.

DU 1 130 is coupled to the RU 1 122 and RU 2 124, and DU 2 132 is coupled to RU 3 126 and RU 4 128. DU 1 130 and DU 2 132 run the RLC, MAC, and parts of the PHY layer. DU 1 130 and DU 2 132 include a subset of the eNB/gNB functions, depending on the functional split option, and operation of DU 1 130 and DU 2 132 are controlled by Centralized Unit (CU) 140. CU 140 is responsible for non-real time, higher L2 and L3. Server and relevant software for CU 140 is able to be hosted at a site or is able to be hosted in an edge cloud (datacenter or central office) depending on transport availability and the interface for the Fronthaul connections 150, 151, 153, 154. The server and relevant software of CU 140 is also able to be co-located at DU 1 130 or DU 132, or is able to be hosted in a regional cloud data center.

CU 140 handles the RRC and PDCP layers. The gNB includes CU 140 and one or more DUs, e.g., DU 1 130, connected to CU 140 via Fs-C and Fs-U interfaces for a Control Plane (CP) 142 and User Plane (UP) 144, respectively. CU 140 with multiple DUs, e.g., DU 1 130, and DU 2 132, support multiple gNBs. The split architecture enables a 5G network to utilize different distribution of protocol stacks between CU 140, and DU 1 130 and DU 2 132, depending on network design and availability of the Midhaul 156. While two connections are shown between CU 140 and DU 1 130 and DU 2 132, CU 140 is able to implement additional connections to other DUs. CU 150, in 5G. is able to implement, for example, 256 endpoints or DUs. CU 140 supports the gNB functions such as transfer of user data, mobility control, RAN sharing (MORAN), positioning, session management etc. However, one or more functions are able to be allocated to the DU. CU 140 controls the operation of DU 130 and DU 132 over the Midhaul interface 156.

Backhaul 158 connects the 4G/5G Core 160 to the CU 140. Core 160 is able to be 200 km away from the CU 140. Core 160 provides access to voice and data networks, such as Internet 170 and Public Switched Telephone Network (PSTN) 172.

According to at least one embodiment, a northbound platform for the network, such as a Service Management and Orchestration (SMO)/NMS 180 is implemented. SMO 180 oversees the orchestration aspects, management and automation of RAN elements. SMO 180 supports O1, A1 and O2 interfaces. Non-RT RIC (non-Real-Time RAN Intelligent Controller) 182 enables non-real-time control and optimization of RAN elements and resources, AI/ML workflow including model training and updates, and policy-based guidance of applications/features in Near-RT RIC 184. Near-RT RIC 184 enables near-real-time control and optimization of O-RAN elements and resources via fine-grained data collection and actions over the E2 interface. Near-RT RIC 184 includes interpretation and enforcement of policies from Non-RT RIC 182, and supports enrichment information to optimize control function.

Figure 2:
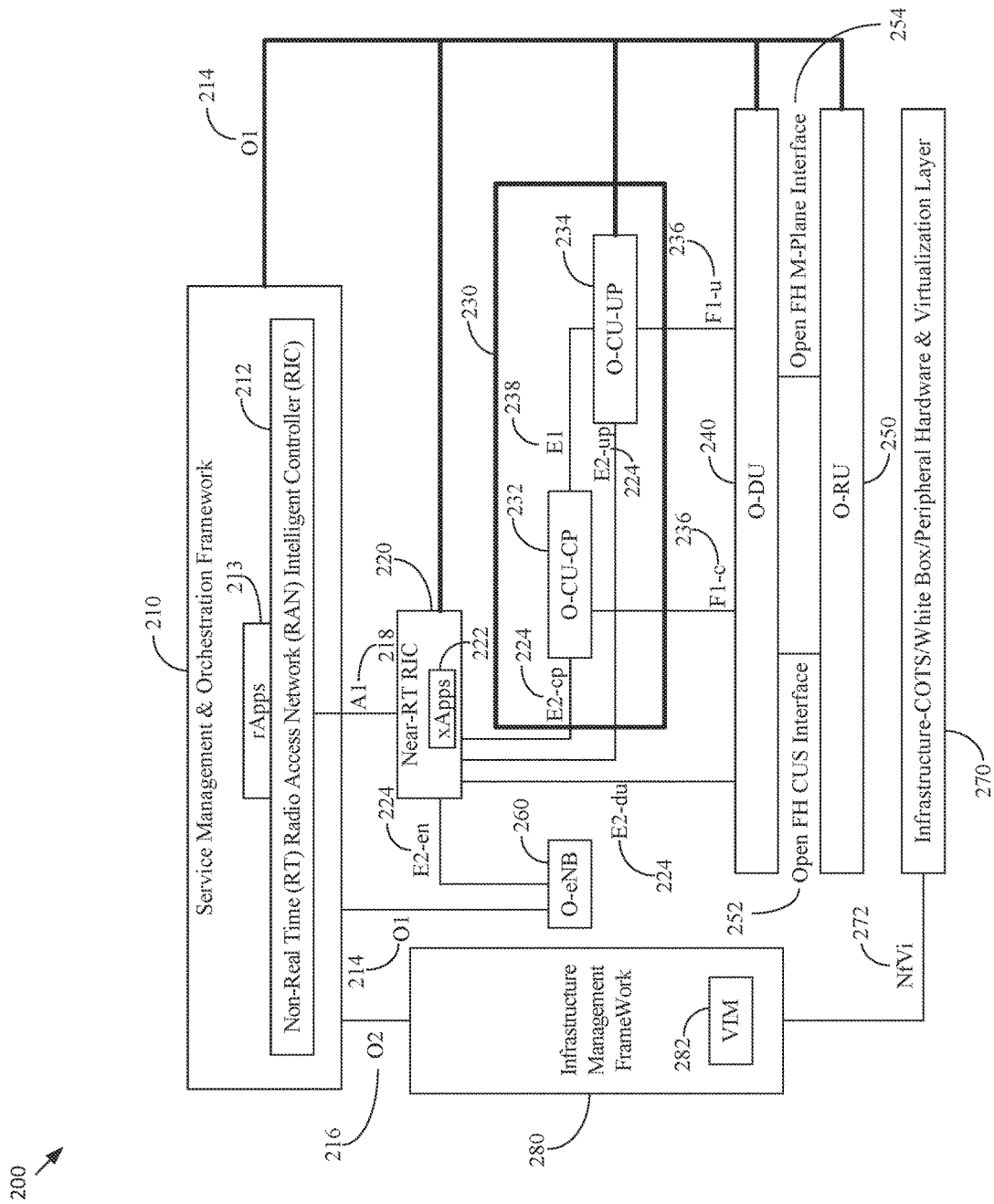
FIG. 2 is a block diagram of an Open Radio Access Network (O-RAN) according to at least one embodiment.

FIG. 2 is a block diagram of an Open Radio Access Network (O-RAN) 200 according to at least one embodiment.

In FIG. 2, Service Management and Orchestration (SMO) Framework 210 is an automation platform for Open RAN Radio Resources. SMO 210 oversees lifecycle management of network functions as well as O-Cloud. SMO 210 includes a Non-Real-Time (RT) Radio Access Network (RAN) Intelligent Controller (RIC) 212. SMO 210 also defines various SMO interfaces, such as the O1 214, O2 216, and A1 218 interfaces.

The A1 interface 218 enables communication between the Non-RT RIC 212 and a Near-RT RIC 220 and supports policy management, data transfer, and machine learning management. The A1 interface 218 is used for policy guidance. SMO 210 provides fine-grained policy guidance such as getting User-Equipment to change frequency, and other data enrichments to RAN functions over the A1 interface 218.

The O1 214 interface connects the SMO 210 to the RAN managed elements, which include the Near-RT RIC 220, O-RAN Centralized Unit (O-CU) 230, O-RAN Distributed Unit (O-DU) 240, O-RAN Radio Unit (O-RU) 250, and the Open Evolved NodeB (O-cNB) 260. The management and orchestration functions are received by the managed elements via the O1 interface 214. The SMO 210 in turn receives data from the managed elements via the O1 interface 214 for AI model training. The O1 interface 214 is further used for managing the operation and maintenance (OAM) of multi-vendor Open RAN functions including fault, configuration, accounting, performance and security management, software management, and file management capabilities.

The O2 interface 216 is used to support cloud infrastructure management and deployment operations with O-Cloud infrastructure that hosts the Open RAN functions in the network. The O2 interface 216 supports orchestration of O-Cloud infrastructure resource management (e.g., inventory, monitoring, provisioning, software management and lifecycle management) and deployment of the Open RAN network functions, providing logical services for managing the lifecycle of deployments that use cloud resources.

SMO 210 provides a common data collection platform for management of RAN data as well as mediation for the O1 214, O2 216, and A1 218 interfaces. Licensing, access control and AI/ML lifecycle management are supported by the SMO 210, together with legacy north-bound interfaces. SMO 210 also supports existing OSS functions, such as service orchestration, inventory, topology and policy control.

The Non-RT RIC 212 enables non-real-time (>1 second) control of RAN elements and their resources through cloud-native microservice-based applications, which are referred to as rApps 213. Herein, application and microservice are used interchangeably. Non-RT RIC 212 communicates with applications called xApps 222 running on a Near-RT RIC 212 to provide policy-based guidance for edge control of RAN elements and their resources. The Non-RT RIC 212 provides non-real-time control and optimization of RAN elements and resources, AI/ML workflow, including model training and updates, and policy-based guidance of applications/features in near-RT RIC 220.

Near-RT RIC 220 controls RAN infrastructure at the cloud edge. Near-RT RIC 220 controls RAN elements and their resources with optimization actions that typically take 10 milliseconds to one second to complete. The Near-RT RIC 220 receives policy guidance from the Non-RT RIC 212 and provides policy feedback to the Non-RT RIC 212 through the xApps 222.

The xApps 222 are used to enhance the RAN's spectrum efficiency. The Near-RT RIC 220 manages a distributed collection of "southbound" RAN functions, and also provides "northbound" interfaces for operators: the O1 214 and A1 218 interfaces to the Non-RT RIC 212 for the management and optimization of the RAN. The Near-RT RIC 220 is thus able to self-optimize across different RAN types, like macros, Massive MIMO and small cells, maximizing network resource utilization for 5G network scaling.

Within the Near-RT RIC 220, the xApps 222 communicate via defined interface channels. An internal messaging infrastructure provides the framework to handle conflict mitigation, subscription management, app lifecycle management functions, and security. Data transfers are implemented via the E2 interface.

The O-RAN is split into a Central Unit (CU) 230, a Distributed Unit (DU) 240, and a Radio Unit (RU) 250. The CU 230 is further split into two logical components, one for the Control Plane (CP) 232, and one for the User Plane (UP) 234. The logical split of the CU 230 into the CP 232 and UP 234 allows different functionalities to be deployed at different locations of the network, as well as on different hardware platforms. For example, CUs 230 and DUs 240 can be virtualized on white box servers at the edge, while the RUs 250 are implemented on Field Programmable Gate Arrays (FPGAs) and Application-specific Integrated Circuits (ASICs) boards and deployed close to RF antennas.

The O-RAN Distributed Unit (O-DU) 240 is an edge server that includes baseband processing and radio frequency (RF) functions. The O-DU 240 hosts radio link control (RLC), MAC, and a physical layer with network function virtualization or containers. O-DU 240 supports one or more cells, and the O-DUs are able to support one or more beams to provide the operating support for O-RU 250 by CUS Control, User, and Synchronization) planes 252, and management (M) planes 254 through front-haul interfaces.

The O-RU 250 processes radio frequencies received by the physical layer of the network. The processed radio frequencies are sent to the O-DU 240 through fronthaul interfaces 252, 254. The O-RU 250 hosts the lower PHY Layer Baseband Processing and RF Front End (RF FE), and is designed to support multiple 3GPP split options.

An Open-Evolved Node B (O-eNB) 260 provides the hardware aspect of the O-RAN. The management and orchestration functions are received by the managed elements via the O1 interface 214. The SMO 210 in turn receives data from the managed elements via the O1 interface 214 for AI model training. The O-eNB 260 communicates with the Near-RT RIC 220 via the E2 interface 224. E2 224 enables near-real-time loops through the streaming of telemetry from the RAN and the feedback with control from the Near-RT RIC 220. The E2 interface 224 connects the Near-RT RIC 220 with an E2 node, such as the O-CU-CP 232, O-CU-UP 234, the O-DU 240, and the O-eNB 260. An E2 node is connected to one Near-RT RIC 220, while a Near-RT RIC is able to be connected to multiple E2 nodes. The protocols over the E2 interface 224 are based on the control plane and supports services and functions of Near-RT RIC 220.

An F1 Interface 236 connects the O-CU-CP 232 and the O-CU-UP 234 to the O-DU 240. Thus, the F1 interface 236 is broken into control and user plane subtypes and exchanges data about the frequency resource sharing and other network statuses. One O-CU 230 can communicate with multiple O-DUs 240 via F1 interfaces 236.

An E1 238 interface connects the O-CU-CP 232 and the O-CU-UP 234. The E1 Interface 238 is used to transfer configuration data and capacity information between the O-CU-CP 232 and the O-CU-UP 234. The configuration data ensures the O-CU-CP 232 and the O-CU-UP 234 are able to interoperate. The capacity information is sent from the O-CU-UP 234 to the O-CU-CP 232 and includes the status of the O-CU-UP 234.

The O-DU 240 communicates with the O-RU 250 via an Open Fronthaul (FH) Control, User, and Synchronization (CUS) Plane Interface 252 and an M-Plane (Management Plane) Interface 254. As part of the CUS Plane Interface 252, the C-Plane (control plane) is a frame format that carries data in real-time control messages between the O-DU 240 and O-RU 250 for use to control user data scheduling, beamforming weight selection, numerology selection, etc. Control messages are sent separately for downlink (DL)-related commands and uplink (UL)-related commands.

The U-Plane carries the user data messages between the O-DU 240 and O-RU 250, such as the in-phase and quadrature-phase (IQ) sample sequence of the orthogonal frequency division multiplexing (OFDM) signal. The S-plane includes synchronization messages used for timing synchronization between O-DU 240 and O-RU 250. The Control and User Plane are also used to send control information from the O-DU 240 to O-RU 250.

The M-Plane 254 connects the O-RU 250 to the O-DU 240, and optionally connects the O-RU 250 to the SMO 210.

The O-DU 240 uses the M-Plane 254 to manage the O-RU 250, while the SMO 210 is able to provide FCAPS services to the O-RU 250. The M-plane 254 supports the management features including startup installation, software management, configuration management, performance management, fault management and file management.

The M-Plane 254 is used by the O-DU 240 to retrieve the capabilities of the O-RU 250 and to send relevant configuration related to the C-Plane and U-Plane (data plane) to the O-RU 250. Together the O1 214 and Open-Fronthaul M-plane 254 interfaces provide a FCAPS (Fault, Configuration, Accounting, Performance, Security) interface with configuration, reconfiguration, registration, security, performance, monitoring aspects exchange with individual nodes, such as O-CU-CP 232, O-CU-UP 234, O-DU 240, and O-RU 250, as well as Non-RT RIC 220.

Infrastructure-COTS/White Box/Peripheral Hardware & Virtualization Layer 270 connects to Infrastructure Management Framework 280 via Network Function Virtualization Interface (NFVI) 272. Virtualized Infrastructure Manager (VIM) 282 at Infrastructure Management Framework 280 controls and manages virtual network functions.

FIGS. 3A-B illustrate the effect of a failure of a functional unit in an Open-Radio Access Network (O-RAN) 300 according to at least one embodiment.

In FIG. 3A the System 300 includes components of an O-RAN 310 that is split into nodes such as Radio Unit (RU) 312, Distributed Unit (DU) 314, and Centralized Unit (CU) 316. As described above, DU 314 provides support for the lower layers of the protocol stack such as RLC, MAC and Physical layer, while CU 316 provides support for the higher layers of the protocol stack such as SDAP, PDCP and RRC, which uses less time-sensitive packet processing. DU 314 performs the real-time baseband processing functions. CU 316 connects to Core Network 320 over N2/N3 interfaces referred to as the Backhaul. The RU 312 is where the radio frequency signals are transmitted, received, amplified, and digitized. The RU 312 is located near or integrated into, the antenna and processes signals between User Equipment (UE) 330 and DU 314.

FIG. 3B includes components of a RAN 350 including a Radio Unit (RU) 352, Distributed Unit (DU) 354, and Centralized Unit (CU) 356. Core Network 360 is connected to CU 356. UE 370 transmits signals to, and receives signals from the mobile network via RU 352.

The Network Functions of nodes of an O-RAN 350, such as CU 356, DU 354, and RU 352, are viewed as a monolithic application. By operating as a monolithic application or black box, then the processes, such as interface management, session management, policy control, application function management, user data management, etc., are processed by a single application. In response to the monolithic application going down for any reason, cash or failure, then the downed application causes downtime of the network.

In FIG. 3B, a failure or application crash is shown occurring in DU 354. The failure or application crash in DU 354 causes service unavailability of the sector. Unavailability is represented at 371, 372, 373, 374 where signaling is interrupted because of the failure or application crash in DU 354. UE 370 connected to O-RAN 350 encounters service discontinuity or abrupt termination of ongoing calls. To recover that entire Network Functions (NFs) of DU 354 are restarted. Restarting the NFs of DU 354 is a time consuming process because of the size and complexity of the DU application.

Figure 4:
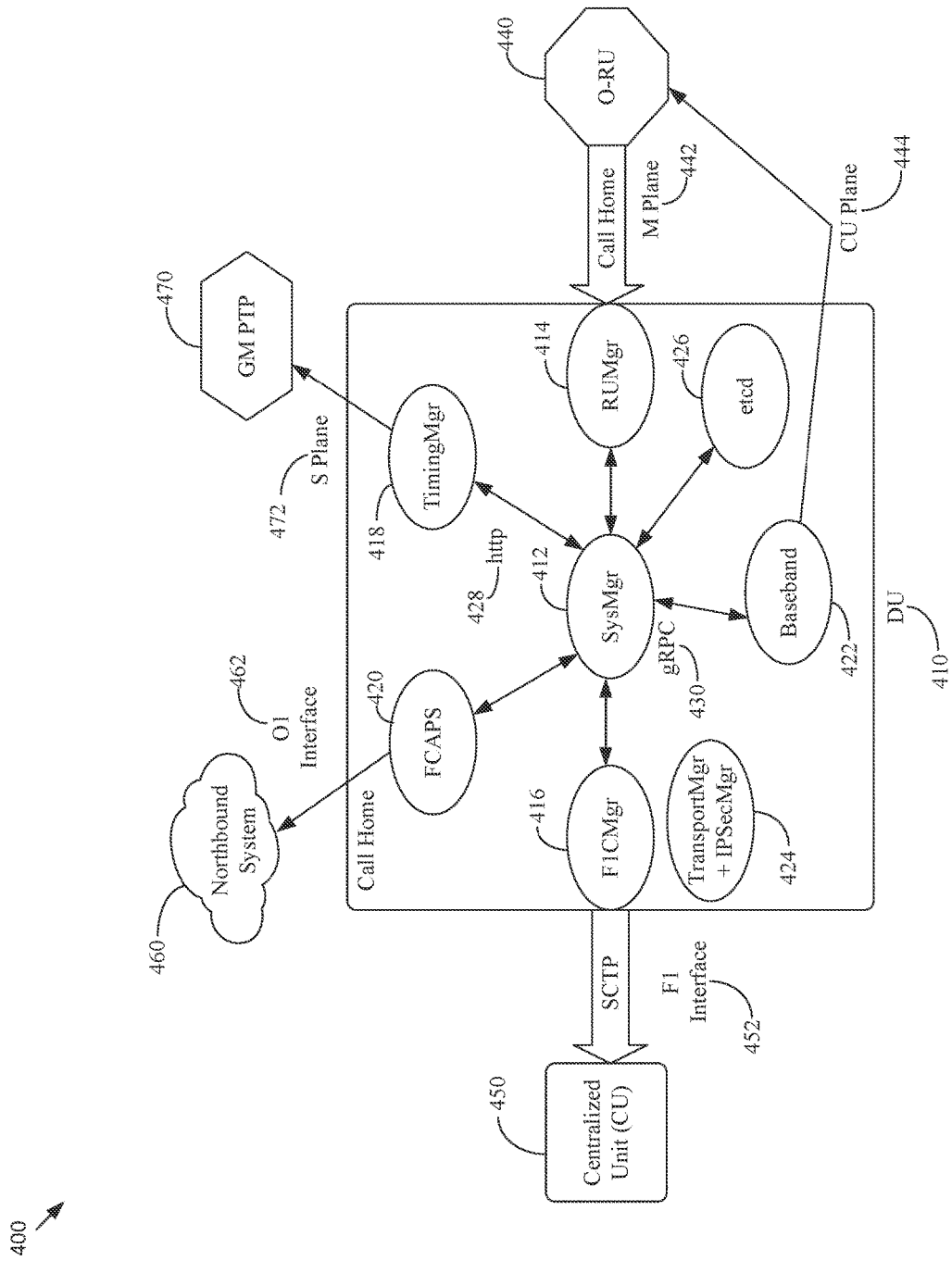
FIG. 4 illustrates division of multiple DU microservices according to at least one embodiment.

FIG. 4 illustrates division of multiple DU microservices 400 according to at least one embodiment.

In FIG. 4, the Network Functions of DU 410 are capable of being implemented as a discrete network element on a dedicated hardware, as a software instance running on dedicated hardware, or as a virtualized function instantiated on an appropriate platform, e.g., dedicated hardware or a cloud infrastructure. The Network Functions of a node are capable of being split into smaller microservices and the microservices are handled independently for configuration and restart. Herein, application and microservice are used interchangeably. DU 410 is shown with multiple microservices that are able to handle microservice failure independently, such as System Manager (SysMgr) microservice 412, RU Manager (RUMgr) microservice 414, FIC Manager (F1CMgr) microservice 416, TimingMgr microservice 418, FCAPS (FCAPS) microservice 420, Baseband microservice 422, Transport Manager (TransportMgr) and Internet Protocol Security (IPsec) Manger (IPSecMgr) microservice 424, and etcd microservice 426. Microservices 412, 414, 416, 418, 420, 422, 424, 426 run inside the node and the microservices interact. In response to one microservice going down, the other microservices are not affected.

DU 410 is connected to O-RU 440 via a Management Plane interface 442 and to Centralized Unit (CU) 450 via an F1 Interface 452. The F1 interface 452 connects the CU 450 to the DU 410 with dedicated sub-interfaces for user and control planes. Management plane (M-plane) 442 provides for the configuration of the functionalities of the RU 440 from the DU 410 and is established as an IPV4 or IPv6 tunnel. M Plane 442 enables the initialization and the management of the connection between the DU 410 and the RU 440, and the configuration of the RU 440.

CU 450 hosts Radio Resource Control (RRC) layer, Service Data Adaptation Protocol (SDAP) layer, and Packet Data Convergence Protocol (PDCP) layer. RRC layer manages the life cycle of the connection. The SDAP layer manages the Quality of Service (QOS) of the traffic flows (also known as bearers). PDCP layer takes care of reordering, packet duplication, and encryption for the air interface, among others.

SysMgr microservice 412 is a central entity that acts as a synchronizer, communicates with other microservices and drives the cell activation call flow. SysMgr microservice 412 has a complete picture of what is happening inside the DU 410.

RUMgr microservice 414 provides interfacing towards the RU 440, and handles Netconf RPC coming from radio (M plane) 442. RUMgr 414 receives a Call Home message from RU 440 via M Plane 442. SysMgr 412 collect statistics and logs from the RUMgr 414.

FIC Manager (F1CMgr) microservice 416 handles F1 Application Protocol (AP) messages towards the F1 interface 452. TimingMgr microservice 418 manages Synchronization Plane (S Plane) 472, and the interface towards the timing stack provided by Grand Master Precision Time Protocol (PTP) 470. FCAPS microservice 420 manages Configuration Management (CM), Performance Management (PM), and Fault Management (FM) services towards Northbound Systems 460. Baseband microservice 422 performs L1 (Higher PHY) and L2 (MAC Schedular) packet processing. TransportMgr and IPSecMgr microservice 424 manages underlying SCTP layer and provide secured tunnel (IPSec) at the F1 interface 452. The etcd microservice 426 acts as a data store microservice that monitors the pods health and reports any pod Up/Down status to dependents services. For example, etcd microservice 426 is able to use a health check application to send heartbeat requests and receive heartbeat responses to determine whether a microservices has failed or crashed.

TransportMgr and IPSecMgr microservices 424 are used for creating, testing, and managing IPSec Connections. IPSec is a secure network protocol suite that authenticates and encrypts packets of data to provide secure encrypted communication between two computers over an Internet Protocol network. IPsec is used for protecting sensitive data, such as financial transactions, medical records and corporate communications, as such information is transmitted across a network. IPSec is also used to secure virtual private networks (VPNs), where IPsec tunneling encrypts data sent between two endpoints. IPsec supports network-level peer authentication, data origin authentication, data integrity, data confidentiality (encryption), and replay protection (protection from replay attacks). In a mobile network, network elements (NEs) are able to be IPSec enabled. During operation, data is directed to a network port, which is a virtual location on a NE. IPSec tunnels are used to connect radio nodes, such as gNB (next generation node B) and ng-eNB (next generation evolved node B), with the core network. The etcd microservice 426 maintains system configuration files in a folder, e.g., "/etc;" where "d" stands for "distributed." Etcd microservice 426 broadcasts a List of states, indicating one or more of the plurality of microservices that are currently down.

The microservices 412, 414, 416, 418, 420, 422, 424, 426 are independently recoverable from any failure to provide the advantages of: avoiding a single point of failure, reducing application spawn time, uninterrupted service delivery by other applications, quick and silent recovery of applications, automatic healing from a software crash, no human intervention during self-healing (cost saving), and high availability. Microservices are able to resume from a last checkpoint. In response to Baseband microservice 422, F1cMgr microservice 416 or TransportMgr and IPSecMgr microservice 424 microservice going down, independently recovery occurs but there is an impact on the cell availability KPI. During recovery of Baseband microservice 422, F1cMgr 416 microservice, or TransportMgr and IPSecMgr microservice 424 microservice, cells are down and UE experiences service discontinuity because Baseband microservice 422, F1cMgr microservice 416 or TransportMgr 424 microservice are responsible for actual UE specific packet processing. However, other microservices are system monitoring applications and do not cause any impact on cell availability upon failure.

O1 Interface 462 connects Northbound System 460, such as a Service Management and Orchestration Framework, with SysMgr 412 for operation and management, by which FCAPS microservice 420, as well as software management, and file management are provided. FCAPS microservice 420 supports various management categories for maintaining and securing Virtual Network Functions (VNFs).

SysMgr 412 maintains states for the different microservices. GM PTP 470 sends PTP timing packets throughout the network via S Plane 472 to TimingMgr 418. GM PTP 470 is able to be coupled to SysMgr 412 via http connection 428 between the SysMgr 412 and the TimingMgr microservice 418. After receiving timing packets, TimingMgr 418 detects the current timing status and forwards the timing status information to Sysmgr 412 via http connection 428. TimingMgr microservices 418 is connected to GM PTP microservice 470 via a the Synchronization Plane (S Plane) 472. S Plane 472 takes care of time, frequency, and phase synchronization between the clocks of the DU 410 and of the RU 440, which enable correct functioning of a time and frequency-slotted system distributed across multiple units. Via the clocks, the DU 410 and RU 440 are able to properly align time and frequency resources for the transmission and reception of different LTE and NR data and control channels. SysMgr 412 uses gRPC (general Remote Procedure Call) 430 to connect microservices in a client-server arrangement. Baseband microservice 422 communicates baseband signals to the O-RU 440 over the CU Plane 444. The process is applicable to any microservices that follow the cloud native architecture like the DU 410.

SysMgr microservice 412 obtains state information from microservices at state transitions. SysMgr microservice 412 sends the states of the plurality of microservices to a database. Operation of the one or more of the plurality of microservices that are currently down is restarted. Once the plurality of microservices come back online, SysMgr microservice 412 starts a Cell Initialization Procedure to move the cell to an Active State. SysMgr microservice 412 receives the List of microservices that are down from eted microservice 426. SysMgr microservice 412 performs a state audit procedure by comparing a Query Response of the current state of the plurality of microservices to State Entries retrieved from the database. Based on the comparing, SysMgr microservice 412 generates Updated Sates for the plurality of microservices. SysMgr microservice 412 provides the Updated States for the plurality of microservices to the database. Operation of the plurality of microservices is resumed based on the Updated States for the plurality of microservices.

Figure 5:
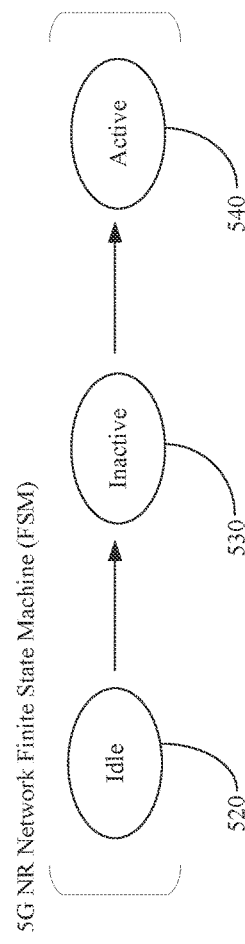
FIG. 5 illustrates a Finite State Machine (FSM) for a 5G New Radio (NR) network according to at least one embodiment.

FIG. 5 illustrates a Finite State Machine (FSM) 500 for a 5G New Radio (NR) network according to at least one embodiment.

Among those above mentioned microservices, some are stateless application (e.g., Baseband microservice 422, TransportMgr and IPSec Manager microservice 424 as shown in FIG. 4) and some are stateful application (e.g., SysMgr microservice 412, F1CMgr microservice 416 also as shown in FIG. 4).

SysMgr microservice handles Finite State Machine (FSM) 500, which means SysMgr microservice maintains the state for the different microservices and has a context of a peer application's/external interface's current state. Once cell configuration is pushed, the SysMgr microservice starts from IDLE state 520 and after a couple of events (interaction with other module) the cell moves to Active state 540. For example, a radio starts in Idle state 520. Then, the radio sends Call Home messages as the RU attempts to connect to the DU. The RU tries to get the timing synchronization, and finally the RU moves to an Active state 540. The state moves to Inactive state 530 in response to the cell being ready to serve the UE and the users. For state transition, the SysMgr writes the current state in a database, along with cell uptime and downtime counter values and private data members.

Figure 6:
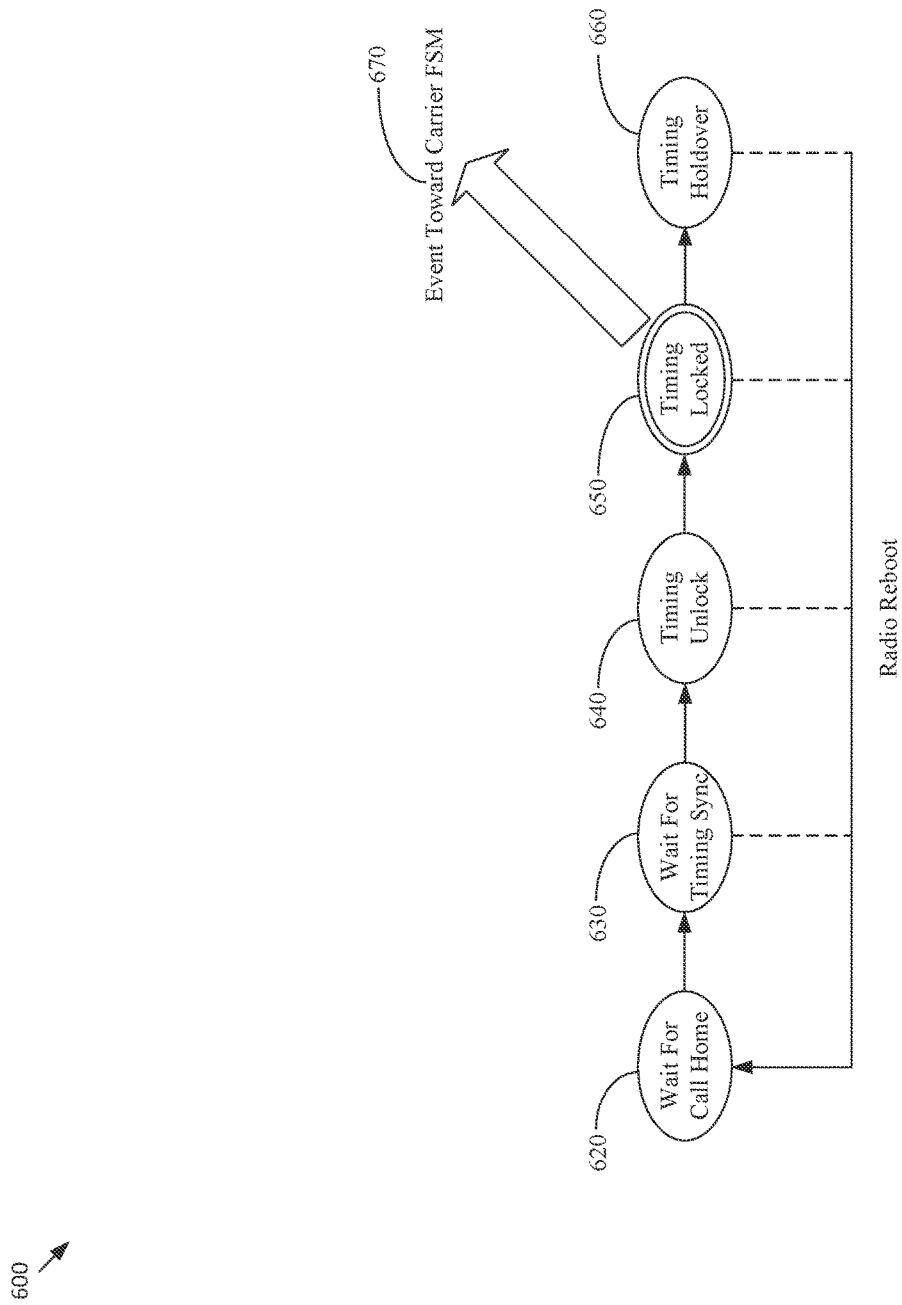
FIG. 6 illustrates the Radio Reboot according to at least one embodiment.

FIG. 6 illustrates the Radio Reboot 600 according to at least one embodiment.

In FIG. 6, the radio sends a message referred to as Call Home 620. The radio waits for Timing Synchronization 630. The PTP Timing status goes from Unlocked 640 to Locked 650. An event is provided to FSM 670 to change the state in the FSM. In response to the synchronization source being lost, the Holder state 660 is entered. The clock is able to remain unchanged or is changed based on predetermined conditions, such as the time spent in the Holdover state 660.

Figure 7:
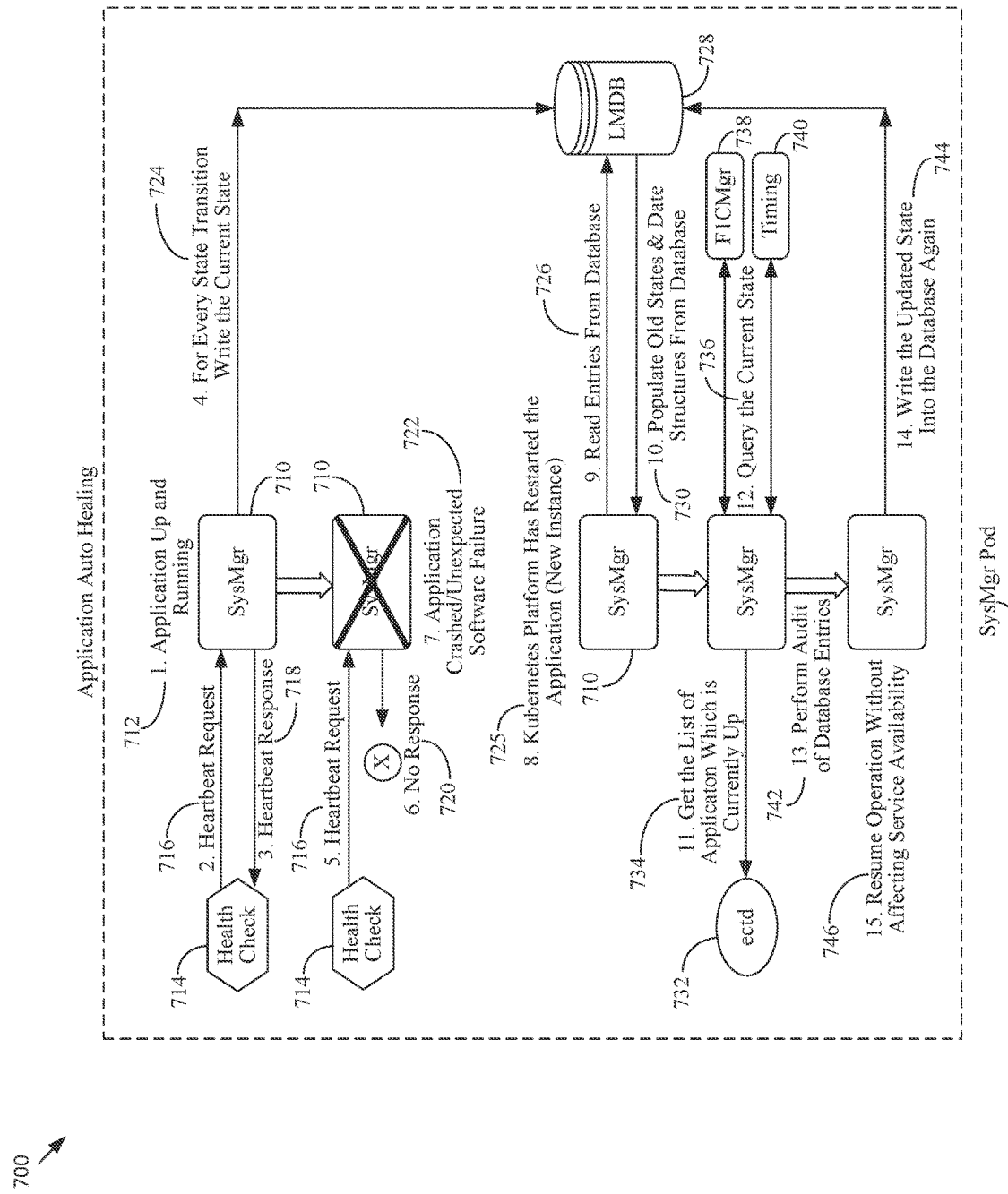
FIG. 7 illustrates Application Auto Healing according to at least one embodiment.

FIG. 7 illustrates Application Auto Healing 700 according to at least one embodiment.

In FIG. 7, a SysMgr Pod 702 includes SysMgr microservices 710 that starts at Application Up and Running 712. SysMgr microservice 710 is a central entity that acts as a synchronizer, communicates with other microservices and drives the cell activation call flow. SysMgr microservice 710 has a complete picture of what is happening inside an O-RAN node. Herein, application and microservice are used interchangeably as the various Network Functions of a node are capable of being implemented as a discrete network element on a dedicated hardware, as a software instance running on dedicated hardware, or as a virtualized function instantiated on an appropriate platform, e.g., dedicated hardware or a cloud infrastructure. The Network Functions of a node are capable of being split into smaller microservices and the microservices are handled independently for configuration and restart.

As described above, for an Open-Radio Access Network (O-RAN) Node, a plurality of microservices are implemented including SysMgr microservices 710. For example, the plurality of microservices include one or more of Health Check Application 714, etcd microservice 732 and one or more other microservices including one or more of a Radio Unit (RU) Manager (RUMgr) Microservice, an FIC Manager (F1CMgr) Microservice, a Timing (Timing) Microservice, an FCAPS (Fault, Configuration, Accounting, Performance, Security) Microservice, a Baseband Microservice, or a Transport Manager (TransportMgr) and IPSec Manger (IPSecMgr) Microservice. An etcd microservice 732 acts as a data store microservice that monitors the pod's health and reports any pod Up/Down status to dependents services.

Health Check Application 714 is continuously running to check whether an application has crashed. Health Check Application 714 is a microservice that is a script that informs the underlying orchestration layer whether a microservice is running or not. Health Check Application 714 sends a Heartbeat Request 716 to the SysMgr microservice 710, and the SysMgr microservice 710 provides a Heartbeat Response 718. As long as the Health Check Application 714 receives the Heartbeat Response 718, the Health Check Application 714 is able to determine the SysMgr microservice 710 has not crashed and is up and running. In response to the Health Check Application 714 receiving no Heartbeat Response 720, Health Check Application 714 determines that the SysMgr microservice 710 has crashed 722. For the state transitions by the plurality of microservices, SysMgr 710 obtains states of the plurality of microservices and writes the current states 724 to Database 728. In at least one embodiment, Database 728 is implemented as a Lightning Memory-Mapped Database (LMDB) that supports a software library that provides an embedded transactional database in the form of a key-value pair store. The key-value pair store identify a microservice and a current state for the microservice.

The underlying Kubernetes layer includes an orchestration layer that restarts 725 the SysMgr microservice 710, or spawns another instance of the SysMgr microservice 710. This applies to a crash of any microservice. Once the Kubernetes layer spawns or restarts 725 the SysMgr microservice 710, the SysMgr microservices 710 reads entries 726 from Database 728 regarding transactions that have been written. Other microservices that are down are able to be restarted by the orchestration layer. Once microservices come back online, SysMgr microservice 412 starts a Cell Initialization Procedure to move the cell to an Active State.

However, in response to the SysMgr microservice 710 reading transactions 726 from the Database 728, some changes are able to occur in one or more microservices in the interim. Thus, the Database 728 is able to point to an entry representing an old state 730. For example, before the SysMgr microservice 710 is restarted 725 and reads the entries 726 in the Database 728, a change in the setup is able to occur, e.g., some state changed.

To address this issue, eted microservice 732 maintains a list of the states of microservices obtained from the Health Check Application 714 and is able to broadcast the list of states of the microservices to identify which microservices are down and which microservices are up and running.

The eted microservice 732 is a distributed key-value store that stores the Kubernetes cluster configuration, data, API objects, and service discovery details, such as a current state for microservices that are currently up. The eted microservice 732 communicates with the other microservices even in response to the SysMgr microservice 710 being down. Eted microservice 732 maintains a heartbeat message with applications with 1 second interval. In response to the F1CMgr microservice 738 being up and running, then F1CMgr microservice 728 responds with a Heartbeat Response. If an application fails to respond to that heartbeat request 3 consecutive times, then eted microservice 732 marks the application as down and broadcast this Down indication to other application. Meanwhile underlying orchestration layer detects this crash using a health check mechanism and restart the application. When the application resumes then connection to etcd microservice 732 re-establishes and broadcasts an Up indication to the other applications, i.e., etcd microservice 732 maintains a list of applications which are currently Up and which are currently Down.

SysMgr microservice 710 obtains from eted microservice 732 the list of applications that are currently up 734 and directs a query to those applications 736, e.g., F1CMgr microservice 738, Timing microservice 740, etc. The SysMgr microservice 710 performs an Audit 742 of state entries obtained from Database 728 by comparing the state entries from the database 730 to the results of the query 736. For example, SysMgr microservice 710 obtains an entry 730 from the Database 728 that indicates that F1CMgr microservice 738 is in Active state, but F1CMgr microservice 738 has crashed and the state of the F1CMgr microservice 738 actually moved to an Inactive state. However, the Inactive State of the F1CMgr microservice 738 is provided in the List 734 obtained from etcd microservice 732.

Based on the audit 742, SysMgr microservice 710 generates an updated state representing the current state of the F1CMgr microservice 738, e.g., Inactive State of the F1CMgr microservice 738 that was provided in the List 734 obtained from eted microservice 732. SysMgr microservice 710 then writes the current state 744 to Database 728. The SysMgr microservice 710 resumes operation without affecting service availability 746. The change in state of F1CMgr microservice 738 does not result in an impact on the end user because the SysMgr microservice 710 is able to obtain the current state of the F1CMgr microservice 738 from eted microservice 732.

Figure 8:
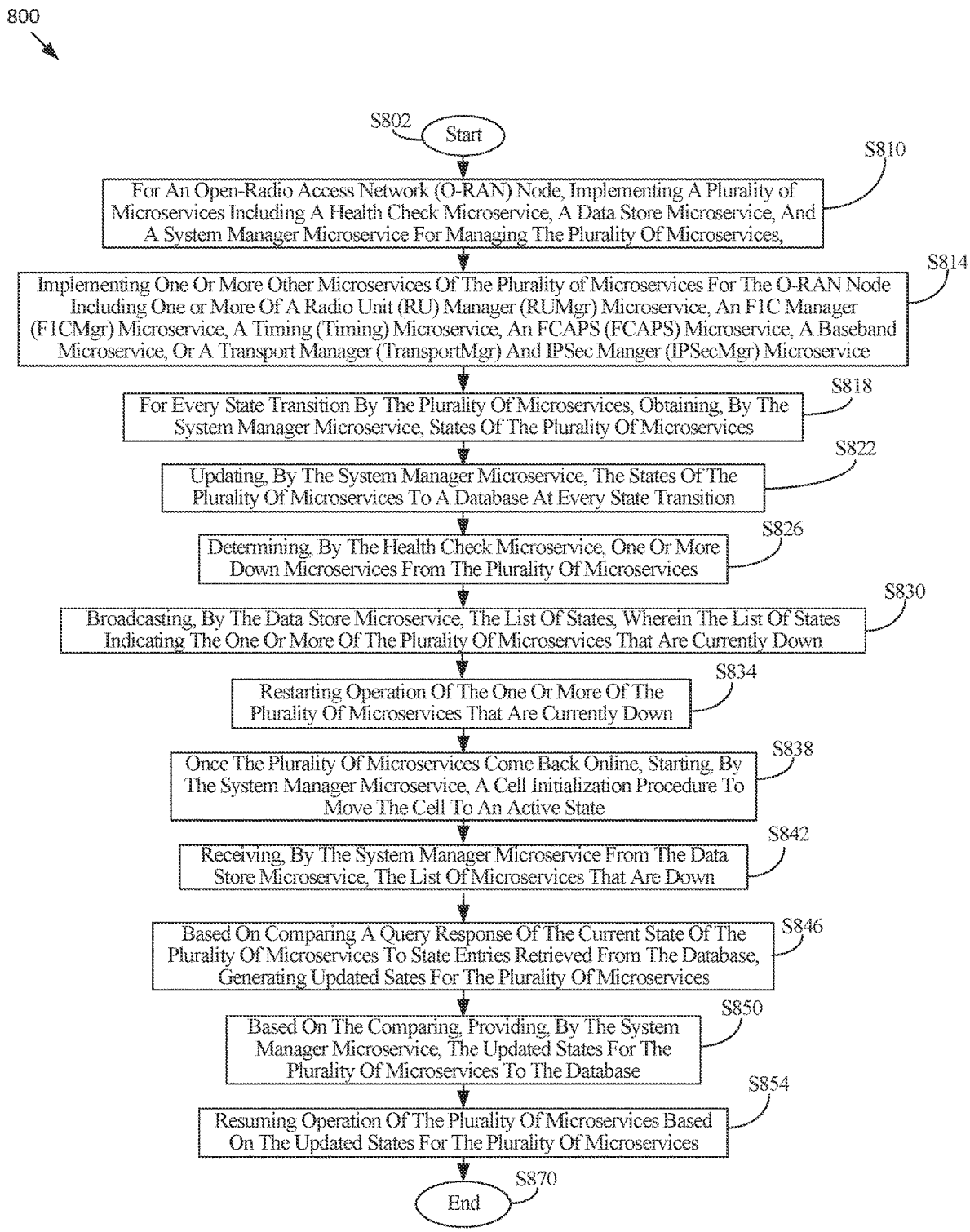
FIG. 8 is a flowchart of a method for providing self-healing of an application in a distributed architecture according to at least one embodiment.

FIG. 8 is a flowchart 800 of a method for providing self-healing of an application in a distributed architecture according to at least one embodiment.

In FIG. 8, the method starts S802 and a plurality of microservices are implemented for an Open-Radio Access Network (O-RAN) Node, including a Health Check Microservice, a Data Store Microservice, and a System Manager Microservice for managing the plurality of microservices S810. Referring to FIG. 7, SysMgr Pod 702 includes SysMgr microservices 710 that starts at Application Up and Running 712. SysMgr microservice 710 is a central entity that acts as a synchronizer, communicates with other microservices and drives the cell activation call flow. SysMgr microservice 710 has a complete picture of what is happening inside an O-RAN node. The plurality of microservices include one or more of Health Check Application 714, etcd microservice 732 and one or more other microservices. An eted microservice 732 acts as a data store microservice that monitors the pod's health and reports any pod Up/Down status to dependents services.

One or more other microservices of the plurality of microservices are implemented for the O-RAN Node including one or more of a Radio Unit (RU) Manager (RUMgr) Microservice, an FIC Manager (F1CMgr) Microservice, a Timing (Timing) Microservice, an FCAPS (Fault, Configuration, Accounting, Performance, Security) Microservice, a Baseband Microservice, or a Transport Manager (TransportMgr) and IPSec Manger (IPSecMgr) Microservice S814. Referring to FIG. 7, the plurality of microservices include one or more other microservices including one or more of a Radio Unit (RU) Manager (RUMgr) Microservice, an FIC Manager (F1CMgr) Microservice, a Timing (Timing) Microservice, an FCAPS (Fault, Configuration, Accounting, Performance, Security) Microservice, a Baseband Microservice, or a Transport Manager (TransportMgr) and IPSec Manger (IPSecMgr) Microservice.

For state transitions by the plurality of microservices, the System Manager Microservice obtains states of the plurality of microservices S818. Referring to FIG. 7, for state transitions by the plurality of microservices, SysMgr 710 obtains states of the plurality of microservices.

The System Manager Microservice updates the states of the plurality of microservices in a Database at state transitions S822. Referring to FIG. 7, for state transitions by the plurality of microservices, SysMgr 710 obtains sends the current states to Database 728.

The Health Check Microservice determines one or more down microservices from the plurality of microservices S826. Referring to FIG. 7, Health Check Application 714 is continuously running to check whether an application has crashed. Health Check Application 714 is a microservice that is a script that informs the underlying orchestration layer whether a microservice is running or not. Health Check Application 714 sends a Heartbeat Request 716 to the SysMgr microservice 710, and the SysMgr microservice 710 provides a Heartbeat Response 718. As long as the Health Check Application 714 receives the Heartbeat Response 718, the Health Check Application 714 is able to determine the SysMgr microservice 710 has not crashed and is up and running. In response to the Health Check Application 714 receiving no Heartbeat Response 720, Health Check Application 714 determines that the SysMgr microservice 710 has crashed 722.

Data Store Microservice broadcasts a List of states, wherein the List of states indicate the one or more of the plurality of microservices that are currently down S830. Referring to FIG. 7, etcd microservice 732 maintains a list of the states of microservices obtained from the Health Check Application 714 and is able to broadcast the list of states of the microservices to identify which microservices are down and which microservices are up and running.

Operation of the one or more of the plurality of microservices that are currently down is restarted S834. Referring to FIG. 7, orchestration layer that restarts 725 the SysMgr microservice 710, or spawns another instance of the SysMgr microservice 710. This applies to a crash of any microservice.

Once the plurality of microservices come back online, the System Manager Microservice starts a Cell Initialization Procedure to move the cell to an Active State S838. Referring to FIG. 7, once microservices come back online, SysMgr microservice 412 starts a Cell Initialization Procedure to move the cell to an Active State.

The System Manager Microservice receives the List of microservices that are down from the Data Store Microservice S842. Referring to FIG. 7. SysMgr microservice 710 obtains from eted microservice 732 the list of applications that are currently Up 734.

Based on comparing a Query Response of the current state of the plurality of microservices to State Entries retrieved from the Database, the System Manager Microservice generates Updated Sates for the plurality of microservices S846. Referring to FIG. 7. SysMgr microservice 710 directs a query to those applications 736, e.g., F1CMgr microservice 738, Timing microservice 740, etc. SysMgr microservice 710 performs an Audit 742 of state entries obtained from Database 728 by comparing the state entries from the database 730 to the results of the query 736. For example, SysMgr microservice 710 obtains an entry 730 from the Database 728 that indicates that F1CMgr microservice 738 is in Active state, but F1CMgr microservice 738 has crashed and the state of the F1CMgr microservice 738 actually moved to an Inactive state. However, the Inactive State of the F1CMgr microservice 738 is provided in the List 734 obtained from eted microservice 732. Based on the audit 742. SysMgr microservice 710 generates an updated state representing the current state of the F1CMgr microservice 738, e.g., Inactive State of the F1CMgr microservice 738 that was provided in the List 734 obtained from eted microservice 732.

the System Manager Microservice provides the Updated States for the plurality of microservices to the Database S850. Referring to FIG. 7 SysMgr microservice 710 then writes the current state 744 to Database 728.

Operation of the plurality of microservices is resumed based on the Updated States for the plurality of microservices S854. Referring to FIG. 7. SysMgr microservice 710 resumes operation without affecting service availability 746. The change in state of F1CMgr microservice 738 does not result in an impact on the end user because the SysMgr microservice 710 is able to obtain the current state of the F1CMgr microservice 738 from eted microservice 732.

The process then terminates S870.

At least one embodiment of the method for providing self-healing of an application in a distributed architecture includes continuously updating, by a system manager microservice, state information of a plurality of microservices to a database, determining, by a health check microservice, one or more down microservices from the plurality of microservices, restarting, by an orchestration layer, the one or more down microservices, generating, by the system manager microservice, updated states by performing an audit of state entries retrieved from the database based on a list of states obtained from a data store microservice to generate updated states for the plurality of microservices, based on the audit of the database entries, providing, by system manager microservice, the updated states for the plurality of microservices to the database, and resuming operation of the plurality of microservices based on the updated states for the plurality of microservices. Accordingly, in at least one embodiment, a method provides self-healing of an application in a distributed architecture. A system manager continuously updates state information of microservices to a database, for example, at state transitions. The system manager acts as a centralized system manager for synchronizing the states for the plurality of microservices, communicating with and managing the plurality of microservices, and controlling cell activation call flow. The system manager generates the updated sates for microservices based on a comparison of the query responses to state entries retrieved from the database. The microservices provide network functions of an O-RAN node, and include the system manager, the health check microservice, the data store microservice, and other microservices. The health check microservice determines whether the microservices are down, including the system manager. Down microservices are restarted based results of the audit of the state entries retrieved from the database. The system manager generates updated states by performing an audit of state entries retrieved from the database based on a list of states obtained from a data store microservice to generate updated states for the microservices. Based on the audit of the state entries retrieved from the database, the system manager provides updated states for the microservices to the database. Operation of the microservices is resumed based on the updated states for the microservices. For example, the data store microservice is able to detect which microservices are currently down. The data store microservice broadcasts a list of states, wherein the list of states is able to indicate the microservices that are currently down. The system manager receives the list of states from the data store microservice, and is able to halt the O-RAN node, inform running microservices to stop operation, and restart down microservices after waiting for microservices to come back online. Once the down microservices in the list come back online, the system manager starts a cell initialization procedure to move the cell to an Active State.

Figure 9:
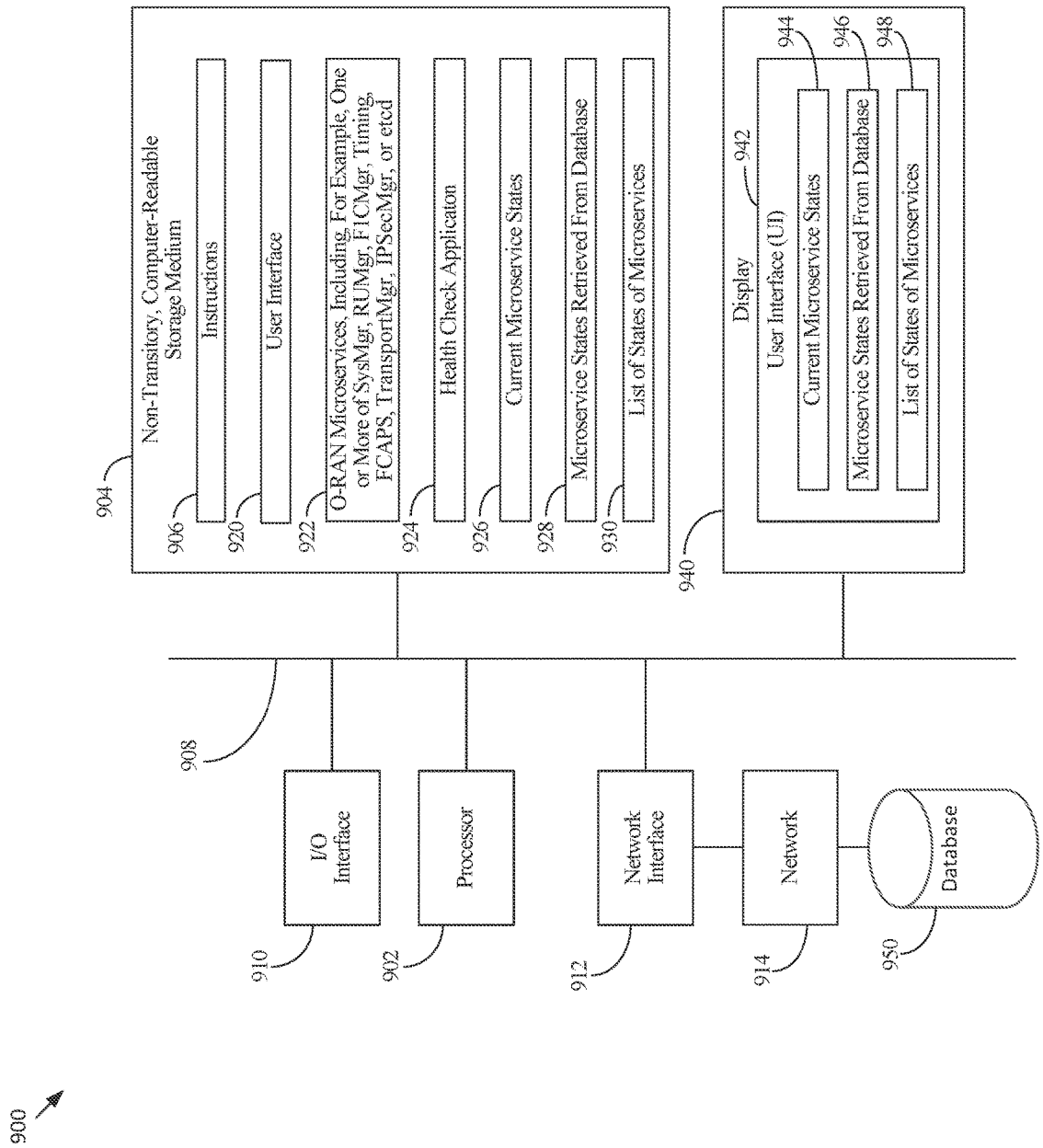
FIG. 9 is a high-level functional block diagram of a processor-based system according to at least one embodiment.

FIG. 9 is a high-level functional block diagram of a processor-based system 900 according to at least one embodiment.

In at least one embodiment, processing circuitry 900 provides self-healing of an application in a distributed architecture. Processing circuitry 900 implements self-healing of an application in a distributed architecture using Processor 902. Processing circuitry 900 also includes a Non-Transitory, Computer-Readable Storage Medium 904 that is used to implement self-healing of an application in a distributed architecture. Non-Transitory, Computer-Readable Storage Medium 904, amongst other things, is encoded with, i.e., stores, Instructions 906, i.e., computer program code, that are executed by Processor 902 causes Processor 902 to perform operations for providing self-healing of an application in a distributed architecture. Execution of Instructions 906 by Processor 902 represents (at least in part) an application which implements at least a portion of the methods described herein in accordance with one or more embodiments (hereinafter, the noted processes and/or methods).

Processor 902 is electrically coupled to Non-Transitory, Computer-Readable Storage Medium 904 via a Bus 908. Processor 902 is electrically coupled to an Input/Output (I/O) Interface 910 by Bus 908. A Network Interface 912 is also electrically connected to Processor 902 via Bus 908. Network Interface 912 is connected to a Network 914, so that Processor 902 and Non-Transitory, Computer-Readable Storage Medium 904 connect to external elements via Network 914. Processor 902 is configured to execute Instructions 906 encoded in Non-Transitory, Computer-Readable Storage Medium 904 to cause processing circuitry 900 to be usable for performing at least a portion of the processes and/or methods. In one or more embodiments, Processor 902 is a Central Processing Unit (CPU), a multi-processor, a distributed processing system, an Application Specific Integrated Circuit (ASIC), and/or a suitable processing unit.

Processing circuitry 900 includes I/O Interface 910. I/O interface 910 is coupled to external circuitry. In one or more embodiments, I/O Interface 910 includes a keyboard, keypad, mouse, trackball, trackpad, touchscreen, and/or cursor direction keys for communicating information and commands to Processor 902.

Processing circuitry 900 also includes Network Interface 912 coupled to Processor 902. Network Interface 912 allows processing circuitry 900 to communicate with Network 914, to which one or more other computer systems are connected. Network Interface 912 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 900 is configured to receive information through I/O Interface 910. The information received through I/O Interface 910 includes one or more of instructions, data, design rules, libraries of cells, and/or other parameters for processing by Processor 902. The information is transferred to Processor 902 via Bus 908. Processing circuitry 900 is configured to receive information related to a User Interface (UI) through I/O Interface 910. The information is stored in Non-Transitory, Computer-Readable Storage Medium 904 as UI 920.

In one or more embodiments, one or more Non-Transitory, Computer-Readable Storage Medium 904 having stored thereon Instructions 906 (in compressed or uncompressed form) that may be used to program a computer, processor, or other electronic device) to perform processes or methods described herein. The one or more Non-Transitory, Computer-Readable Storage Medium 904 include one or more of an electronic storage medium, a magnetic storage medium, an optical storage medium, a quantum storage medium, or the like.

For example, the Non-Transitory, Computer-Readable Storage Medium 904 may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more Non-Transitory Computer-Readable Storage Media 904 includes a Compact Disk-Read Only Memory (CD-ROM), a Compact Disk-Read/Write (CD-R/W), and/or a Digital Video Disc (DVD).

In one or more embodiments, Non-Transitory, Computer-Readable Storage Medium 904 stores Instructions 906 configured to cause Processor 902 to perform at least a portion of the processes and/or methods for providing self-healing of an application in a distributed architecture. In one or more embodiments, Non-Transitory, Computer-Readable Storage Medium 904 also stores information, such as algorithm which facilitates performing at least a portion of the processes and/or methods for providing self-healing of an application in a distributed architecture.

Accordingly, in at least one embodiment, Processor 902 executes Instructions 906 stored on the one or more Non-Transitory, Computer-Readable Storage Medium 904 for providing self-healing of an application in a distributed architecture. Processor 902 executes Instructions 906 to implement one or more microservices for providing Network Functions of a node. The microservices are handled independently for configuration and restart. In one embodiment, Processor 902 implements microservices for an Open-Radio Access Network (O-RAN) Node, such as a Distributed Unit (DU), Centralized Unit (CU), or Radio Unit (RU). For example, Processor 902 is able to implement microservices for a DU that includes one or more of a System Manager (SysMgr) microservice 412, a RU Manager (RUMgr) microservice 414, an FIC Manager (F1CMgr) microservice 416, a Timing Manager (TimingMgr) microservice 418, an FCAPS (FCAPS) microservice 420, a Baseband microservice 422, a Transport Manager (TransportMgr) and IPSec Manger (IPSecMgr) microservice 424, and an etcd microservice 426, which is a data store microservice. Processor 902 is also capable of implementing a health check microservice. Processor 902 executes Instructions 906 to cause a System Manager Microservice 922 to obtain states of the plurality of microservices 922 and to update the states of the plurality of microservices 922 in Database 950 at the state transitions. System Manager Microservice 922 is a central entity that acts as a synchronizer, communicates with other microservices and drives the cell activation call flow. System Manager Microservice 922 has a complete picture of what is happening inside an O-RAN node. Processor 902 executes Instructions 906 to cause Health Check Microservice 924 to determine which of microservices 922 are down. Processor 902 executes Instructions 906 to cause Data Store Microservice to broadcast a List of states 930 for the plurality of microservices 922. Processor 902 restarts the one or more of the plurality of microservices 922 that are currently down. Once the plurality of microservices 922 return to an online state, Processor 902 executes Instructions 906 to cause System Manager Microservice to start a Cell Initialization Procedure to move the cell to an Active State. The System Manager Microservice receives the List of microservices 930 that are down from the Data Store Microservice. System Manager Microservice sends a query to microservices in the List 930 to retrieve a current state 926. Then, Processor 902 causes System Manager Microservice to perform an audit of the states of the plurality of microservices by comparing a Query Response of the current state 930 of the plurality of microservices 922 to Microservice States 928 retrieved from the Database 950. Processor 902 causes System Manager Microservice to generate Updated Sates for the plurality of microservices 922 and provides the Updated States to the Database 950. Processor 902 resumes operation of the plurality of microservices based on the Updated States. Processor 902 executes Instructions 906 to present a User Interface 942 on Display 940. User Interface 942 is able to display Current Microservice States 944, Microservice States 946 retrieved from Database 950, and the List of States of Microservices 948 provided by the Data Store Microservice. Accordingly, Processor 902 is able to continuously update state information of a plurality of microservices to a database, determine one or more down microservices from the plurality of microservices, restart the one or more down microservices, generate updated states by performing an audit of state entries retrieved from the database based on a list of states obtained from a data store microservice to generate updated states for the plurality of microservices, based on the audit of the database entries, provide the updated states for the plurality of microservices to the database, and resume operation of the plurality of microservices based on the updated states for the plurality of microservices.

Embodiments described herein provide a method that provides one or more advantages. For example, implementation of at least one embodiment is able to avoid a single point of failure, reduce application spawn time, provide zero impact in cell availability KPI due to application failure, provide uninterrupted service delivery by application, enable quick recovery of the application, enable automatic healing from software crashes, eliminates use of human intervention during self-healing (cost saving), provide high availability restarts from a last checkpoint, etc.

An aspect of this description is directed to an method [1] for providing self-healing of an application in a distributed architecture, including continuously updating, by a system manager microservice, state information of a plurality of microservices to a database, determining, by a health check microservice, one or more down microservices from the plurality of microservices, restarting, by an orchestration layer, the one or more down microservices, generating, by the system manager microservice, updated states by performing an audit of state entries retrieved from the database based on a list of states obtained from a data store microservice to generate updated states for the plurality of microservices, based on the audit of the database entries, providing, by system manager microservice, the updated states for the plurality of microservices to the database, and resuming operation of the plurality of microservices based on the updated states for the plurality of microservices.

The method described in [1], wherein the continuously updating, by a system manager microservice, state information of a plurality of microservices to a database further includes implementing an Open-Radio Access Network (O-RAN) node using the plurality of microservices providing network functions of the O-RAN node, the plurality of microservices including the system manager microservice for managing the plurality of microservices, the health check microservice, the data store microservice, and other microservices providing the network functions of the O-RAN node, for state transitions by the other microservices, obtaining, by the system manager microservice, states of the other microservices; and updating, by the system manager microservice, the states of the other microservices to a database at state transitions.

The method described in [2], wherein the implementing the O-RAN node using the plurality of microservices further includes implementing a distributed unit node of the O-RAN using at least one of a Radio Unit (RU) Manager (RUMgr) microservice, an FIC Manager (F1CMgr) microservice, a Timing (Timing) microservice, an FCAPS (FCAPS) microservice, a Baseband microservice, a Transport Manager (TransportMgr) and IPSec Manger (IPSecMgr) microservice, or the eted microservice.

The method described in [2], wherein the implementing the Open-Radio Access Network (O-RAN) node using the system manager microservice includes implementing a central system manager microservice for synchronizing the states for the plurality of microservices, communicating with and managing the plurality of microservices, and controlling cell activation call flow.

The method described in any one of [1] to [2], wherein the performing the audit of the state entries retrieved from the database based on a list of states obtained from a data store microservice further includes based on the list of states obtained from the data store microservice, querying the plurality of microservices to obtain a current state of the plurality of microservices, comparing a query response of the current state of the plurality of microservices to the state entries retrieved from the database, and based on the comparing the query response of the current state of the plurality of microservices to the state entries retrieved from the database, generating updated sates for the plurality of microservices.

The method described in any one of [1], [2] or [5], wherein the determining, by the health check microservice, the one or more down microservices from the plurality of microservices further includes determining the system manager is down, and the restarting the one or more down microservices further includes restarting the system manager microservice based on performing the audit of the state entries retrieved from the database.

The method described in any one of [1], [2], [5], or [6], wherein the determining, by the health check microservice, the one or more down microservices from the plurality of microservices further includes detecting, by the data store microservice, that two or more of the plurality of microservices are currently down, broadcasting, by the data store microservice, the list of states, wherein the list of states indicating the two or more of the plurality of microservices that are currently down, receiving, by the system manager microservice from the data store microservice, the list of microservices that are down, halting, by the system manager microservice, the O-RAN node, informing, by the system manager microservice, running microservices to stop operation, and the restarting, by an orchestration layer, the one or more down microservices further includes waiting, by the service manager microservice, for the two or more of the plurality of microservices that are currently down to come back online, and, once the two or more of the plurality of microservices in the list come back online, starting, by the system manager microservice, a cell initialization procedure to move the cell to an Active State.

An aspect of this description is directed to an Open-Radio Access Network (O-RAN) Node [8], including a memory storing computer-readable instructions, and a processor connected to the memory, wherein the processor is configured to execute the computer-readable instructions to continuously update state information of a plurality of microservices to a database, determine one or more down microservices from the plurality of microservices, restart the one or more down microservices, generate updated states by performing an audit of state entries retrieved from the database based on a list of states obtained from a data store microservice to generate updated states for the plurality of microservices, based on the audit of the database entries, provide the updated states for the plurality of microservices to the database, and resume operation of the plurality of microservices based on the updated states for the plurality of microservices.

The O-RAN Node described in [8], wherein the processor is further configured to continuously update the state information of the plurality of microservices to a database by implementing an Open-Radio Access Network (O-RAN) node using the plurality of microservices providing network functions of the O-RAN node, the plurality of microservices including the system manager microservice for managing the plurality of microservices, the health check microservice, the data store microservice, and other microservices providing the network functions of the O-RAN node, obtaining for state transitions by the other microservices, states of the other microservices, and updating the states of the other microservices to a database at state transitions.

The O-RAN Node described in [9], wherein the processor is further configured to implement the O-RAN node using the plurality of microservices by implementing a distributed unit node of the O-RAN using at least one of a Radio Unit (RU) Manager (RUMgr) microservice, an FIC Manager (F1CMgr) microservice, a Timing (Timing) microservice, an FCAPS (FCAPS) microservice, a Baseband microservice, a Transport Manager (TransportMgr) and IPSec Manger (IPSecMgr) microservice, or the data store microservice.

The O-RAN Node described in [9], wherein the processor is further configured to implement the Open-Radio Access Network (O-RAN) node using the system manager microservice by implementing a central system manager microservice for synchronizing the states for the plurality of microservices, communicating with and managing the plurality of microservices, and controlling cell activation call flow.

The O-RAN Node described in any one of [8] or [9], wherein the processor is further configured to perform the audit of the state entries retrieved from the database based on a list of states obtained from the data store microservice by querying the plurality of microservices to obtain a current state of the plurality of microservices based on the list of states obtained from the data store microservice, comparing a query response of the current state of the plurality of microservices to the state entries retrieved from the database, and, based on the comparing the query response of the current state of the plurality of microservices to the state entries retrieved from the database, generating updated sates for the plurality of microservices.

The O-RAN Node described in any one of [8], [9], or [12], wherein the processor is further configured to determine the one or more down microservices from the plurality of microservices by determining the system manager is down, and to restart the one or more down microservices by restarting the system manager microservice based on performing the audit of the state entries retrieved from the database.

The O-RAN Node described in any one of [8], [9], [12], or [13], wherein the processor is further configured to determine the one or more down microservices from the plurality of microservices by detecting that two or more of the plurality of microservices are currently down, broadcasting the list of states, wherein the list of states indicating the two or more of the plurality of microservices that are currently down, receiving, from the data store microservice, the list of microservices that are down, halting the O-RAN node, informing running microservices to stop operation, and restart the one or more down microservices by waiting for the two or more of the plurality of microservices that are currently down to come back online, and, once the two or more of the plurality of microservices in the list come back online, starting a cell initialization procedure to move the cell to an Active State.

An aspect of this description is directed to a non-transitory computer-readable media having computer-readable instructions stored thereon [15], which when executed by a processor causes the processor to perform operations including continuously updating, by a system manager microservice, state information of a plurality of microservices to a database, determining, by a health check microservice, one or more down microservices from the plurality of microservices, restarting, by an orchestration layer, the one or more down microservices, generating, by the system manager microservice, updated states by performing an audit of state entries retrieved from the database based on a list of states obtained from a data store microservice to generate updated states for the plurality of microservices, based on the audit of the database entries, providing, by system manager microservice, the updated states for the plurality of microservices to the database, and resuming operation of the plurality of microservices based on the updated states for the plurality of microservices.

The non-transitory computer-readable media described in [15], wherein the continuously updating, by a system manager microservice, state information of a plurality of microservices to a database further includes implementing an Open-Radio Access Network (O-RAN) node using the plurality of microservices providing network functions of the O-RAN node, the plurality of microservices including the system manager microservice for managing the plurality of microservices, the health check microservice, the data store microservice, and other microservices providing the network functions of the O-RAN node, for state transitions by the other microservices, obtaining, by the system manager microservice, states of the other microservices, and updating, by the system manager microservice, the states of the other microservices to a database at state transitions.

The non-transitory computer-readable media described in [16], wherein the implementing the O-RAN node using the plurality of microservices further includes implementing a distributed unit node of the O-RAN using at least one of a Radio Unit (RU) Manager (RUMgr) microservice, an FIC Manager (F1CMgr) microservice, a Timing (Timing) microservice, an FCAPS (FCAPS) microservice, a Baseband microservice, a Transport Manager (TransportMgr) and IPSec Manger (IPSecMgr) microservice, or the eted microservice.

The non-transitory computer-readable media described in any one of [15], or [16], wherein the performing the audit of the state entries retrieved from the database based on a list of states obtained from a data store microservice further includes based on the list of states obtained from the data store microservice, querying the plurality of microservices to obtain a current state of the plurality of microservices, comparing a query response of the current state of the plurality of microservices to the state entries retrieved from the database, and based on the comparing the query response of the current state of the plurality of microservices to the state entries retrieved from the database, generating updated sates for the plurality of microservices.

The non-transitory computer-readable media described in any one of [15], or [18], wherein the determining, by the health check microservice, the one or more down microservices from the plurality of microservices further includes determining the system manager is down, and the restarting the one or more down microservices further includes restarting the system manager microservice based on performing the audit of the state entries retrieved from the database.

The non-transitory computer-readable media described in any one of [15], [16], or [19], wherein the determining, by the health check microservice, the one or more down microservices from the plurality of microservices further includes detecting, by the data store microservice, that two or more of the plurality of microservices are currently down, broadcasting, by the data store microservice, the list of states, wherein the list of states indicating the two or more of the plurality of microservices that are currently down, receiving, by the system manager microservice from the data store microservice, the list of microservices that are down, halting, by the system manager microservice, the O-RAN node, informing, by the system manager microservice, running microservices to stop operation, and the restarting, by an orchestration layer, the one or more down microservices further includes waiting, by the service manager microservice, for the two or more of the plurality of microservices that are currently down to come back online, and, once the two or more of the plurality of microservices in the list come back online, starting, by the system manager microservice, a cell initialization procedure to move the cell to an Active State.

Separate instances of these programs can be executed on or distributed across any number of separate computer systems. Thus, although certain steps have been described as being performed by certain devices, software programs, processes, or entities, this need not be the case. A variety of alternative implementations are able to be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for providing self-healing of an application in a distributed architecture, comprising:
    continuously updating, by a system manager microservice, state information of a plurality of microservices to a database;
    determining, by a health check microservice, one or more down microservices from the plurality of microservices;
    restarting, by an orchestration layer, the one or more down microservices;
    generating, by the system manager microservice, updated states by performing an audit of state entries retrieved from the database based on a list of states obtained from a data store microservice to generate updated states for the plurality of microservices;
    based on the audit of the state entries retrieved from the database, providing, by the system manager microservice, the updated states for the plurality of microservices to the database; and
    resuming operation of the plurality of microservices based on the updated states for the plurality of microservices.

2. The method of claim 1, wherein the continuously updating, by the system manager microservice, the state information of the plurality of microservices to the database includes:
    implementing an Open-Radio Access Network (O-RAN) node using the plurality of microservices providing network functions of the O-RAN node, the plurality of microservices including the system manager microservice for managing the plurality of microservices, the health check microservice, the data store microservice, and other microservices providing the network functions of the O-RAN node;
    for state transitions by the other microservices, obtaining, by the system manager microservice, states of the other microservices; and
    updating, by the system manager microservice, the states of the other microservices to the database at the state transitions.

3. The method of claim 2, wherein the implementing the O-RAN node using the plurality of microservices includes implementing a distributed unit node of the O-RAN node using at least one of a Radio Unit (RU) Manager (RUMgr) microservice, an F1C Manager (F1CMgr) microservice, a Timing (Timing) microservice, an FCAPS (FCAPS) microservice, a Baseband microservice, a Transport Manager (TransportMgr) and Internet Protocol Security (IPsec) Manager (IPSecMgr) microservice, or the data store microservice.

4. The method of claim 2, wherein the implementing the Open-Radio Access Network (O-RAN) node using the system manager microservice includes implementing a central system manager microservice for synchronizing the states for the plurality of microservices, communicating with and managing the plurality of microservices, and controlling cell activation call flow.

5. The method of claim 1, wherein the performing the audit of the state entries retrieved from the database based on the list of states obtained from the data store microservice includes:
    based on the list of states obtained from the data store microservice, querying the plurality of microservices to obtain a current state of the plurality of microservices;
    comparing a query response of the current state of the plurality of microservices to the state entries retrieved from the database; and
    based on the comparing the query response of the current state of the plurality of microservices to the state entries retrieved from the database, generating updated states for the plurality of microservices.

6. The method of claim 1, wherein
    the determining, by the health check microservice, the one or more down microservices from the plurality of microservices includes determining the system manager microservice is down; and
    the restarting the one or more down microservices includes restarting the system manager microservice based on performing the audit of the state entries retrieved from the database.

7. The method of claim 1 wherein:
    the determining, by the health check microservice, the one or more down microservices from the plurality of microservices includes detecting, by the data store microservice, that two or more of the plurality of microservices are currently down, broadcasting, by the data store microservice, the list of states, wherein the list of states indicating the two or more of the plurality of microservices that are currently down, receiving, by the system manager microservice from the data store microservice, the list of states indicating the two or more of the plurality of microservices that are currently down, halting, by the system manager microservice, the plurality of microservices, and informing, by the system manager microservice, running microservices to stop operation, and
    the restarting, by the orchestration layer, the one or more down microservices includes waiting, by the system manager microservice, for the two or more of the plurality of microservices that are currently down to come back online, and, once the two or more of the plurality of microservices in the list of states come back online, starting, by the system manager microservice, a cell initialization procedure to move a cell to an Active State.

8. An Open-Radio Access Network (O-RAN) Node, comprising:
    a memory storing computer-readable instructions; and
    a processor connected to the memory, wherein the processor is configured to execute the computer-readable instructions to:
        continuously update state information of a plurality of microservices to a database;
        determine one or more down microservices from the plurality of microservices;

restart the one or more down microservices;
generate updated states by performing an audit of state entries retrieved from the database based on a list of states obtained from a data store microservice to generate updated states for the plurality of microservices;
based on the audit of the state entries retrieved from the database, provide the updated states for the plurality of microservices to the database; and
resume operation of the plurality of microservices based on the updated states for the plurality of microservices.

9. The O-RAN Node of claim 8, wherein the processor is further configured to continuously update the state information of the plurality of microservices to the database by implementing the plurality of microservices providing network functions, the plurality of microservices including a system manager microservice for managing the plurality of microservices, a health check microservice, the data store microservice, and other microservices providing the network functions, obtain for state transitions by the other microservices, states of the other microservices, and update the states of the other microservices to the database at the state transitions.

10. The O-RAN Node of claim 9, wherein the processor is further configured to implement the plurality of microservices by implementing a distributed unit node using at least one of a Radio Unit (RU) Manager (RUMgr) microservice, an FIC Manager (F1CMgr) microservice, a Timing (Timing) microservice, an FCAPS (FCAPS) microservice, a Baseband microservice, a Transport Manager (TransportMgr) and Internet Protocol Security (IPsec) Manger (IPSecMgr) microservice, or the data store microservice.

11. The O-RAN Node of claim 9, wherein the processor is further configured to implement the system manager microservice by implementing a central system manager microservice for synchronizing the states for the plurality of microservices, communicating with and managing the plurality of microservices, and controlling cell activation call flow.

12. The O-RAN Node of claim 8, wherein the processor is further configured to perform the audit of the state entries retrieved from the database based on the list of states obtained from the data store microservice by querying the plurality of microservices to obtain a current state of the plurality of microservices based on the list of states obtained from the data store microservice, comparing a query response of the current state of the plurality of microservices to the state entries retrieved from the database, and, based on the comparing the query response of the current state of the plurality of microservices to the state entries retrieved from the database, generating updated states for the plurality of microservices.

13. The O-RAN Node of claim 8, wherein the processor is further configured to determine the one or more down microservices from the plurality of microservices by determining a system manager microservice is down, and to restart the one or more down microservices by restarting the system manager microservice based on performing the audit of the state entries retrieved from the database.

14. The O-RAN Node of claim 8, wherein the processor is further configured to:
determine the one or more down microservices from the plurality of microservices by detecting that two or more of the plurality of microservices are currently down, broadcasting the list of states, wherein the list of states indicating the two or more of the plurality of microservices that are currently down, receiving, from the data store microservice, the list of states indicating the two or more of the plurality of microservices that are currently down, halting the plurality of microservices, and informing running microservices to stop operation, and
restart the one or more down microservices by waiting for the two or more of the plurality of microservices that are currently down to come back online, and, once the two or more of the plurality of microservices in the list of states come back online, starting a cell initialization procedure to move a cell to an Active State.

15. A non-transitory computer-readable media having computer-readable instructions stored thereon, which when executed by a processor causes the processor to perform operations comprising:
continuously updating, by a system manager microservice, state information of a plurality of microservices to a database;
determining, by a health check microservice, one or more down microservices from the plurality of microservices;
restarting, by an orchestration layer, the one or more down microservices;
generating, by the system manager microservice, updated states by performing an audit of state entries retrieved from the database based on a list of states obtained from a data store microservice to generate updated states for the plurality of microservices;
based on the audit of the state entries retrieved from the database, providing, by the system manager microservice, the updated states for the plurality of microservices to the database; and
resuming operation of the plurality of microservices based on the updated states for the plurality of microservices.

16. The non-transitory computer-readable media of claim 15, wherein the continuously updating, by the system manager microservice, the state information of the plurality of microservices to the database includes:
implementing an Open-Radio Access Network (O-RAN) node using the plurality of microservices providing network functions of the O-RAN node, the plurality of microservices including the system manager microservice for managing the plurality of microservices, the health check microservice, the data store microservice, and other microservices providing the network functions of the O-RAN node;
for state transitions by the other microservices, obtaining, by the system manager microservice, states of the other microservices; and
updating, by the system manager microservice, the states of the other microservices to the database at the state transitions.

17. The non-transitory computer-readable media of claim 16, wherein the implementing the O-RAN node using the plurality of microservices further includes implementing a distributed unit node of the O-RAN node using at least one of a Radio Unit (RU) Manager (RUMgr) microservice, an F1C Manager (F1CMgr) microservice, a Timing (Timing) microservice, an FCAPS (FCAPS) microservice, a Baseband microservice, a Transport Manager (TransportMgr) and Internet Protocol Security (IPsec) Manger (IPSecMgr) microservice, or the data store microservice.

18. The non-transitory computer-readable media of claim 15, wherein the performing the audit of the state entries retrieved from the database based on the list of states obtained from the data store microservice includes:

based on the list of states obtained from the data store microservice, querying the plurality of microservices to obtain a current state of the plurality of microservices;

comparing a query response of the current state of the plurality of microservices to the state entries retrieved from the database; and based on the comparing the query response of the current state of the plurality of microservices to the state entries retrieved from the database, generating updated states for the plurality of microservices.

19. The non-transitory computer-readable media of claim 15, wherein the determining, by the health check microservice, the one or more down microservices from the plurality of microservices includes determining the system manager microservice is down; and the restarting the one or more down microservices includes restarting the system manager microservice based on performing the audit of the state entries retrieved from the database.

20. The non-transitory computer-readable media of claim 15, wherein:

the determining, by the health check microservice, the one or more down microservices from the plurality of microservices includes detecting, by the data store microservice, that two or more of the plurality of microservices are currently down, broadcasting, by the data store microservice, the list of states, wherein the list of states indicating the two or more of the plurality of microservices that are currently down, receiving, by the system manager microservice from the data store microservice, the list of states indicating the two or more of the plurality of microservices that are currently down, halting, by the system manager microservice, the plurality of microservices, and informing, by the system manager microservice, running microservices to stop operation, and the restarting, by the orchestration layer, the one or more down microservices includes waiting, by the system manager microservice, for the two or more of the plurality of microservices that are currently down to come back online, and, once the two or more of the plurality of microservices in the list of states come back online, starting, by the system manager microservice, a cell initialization procedure to move a cell to an Active State.

* * * * *